Patented Nov. 25, 1952

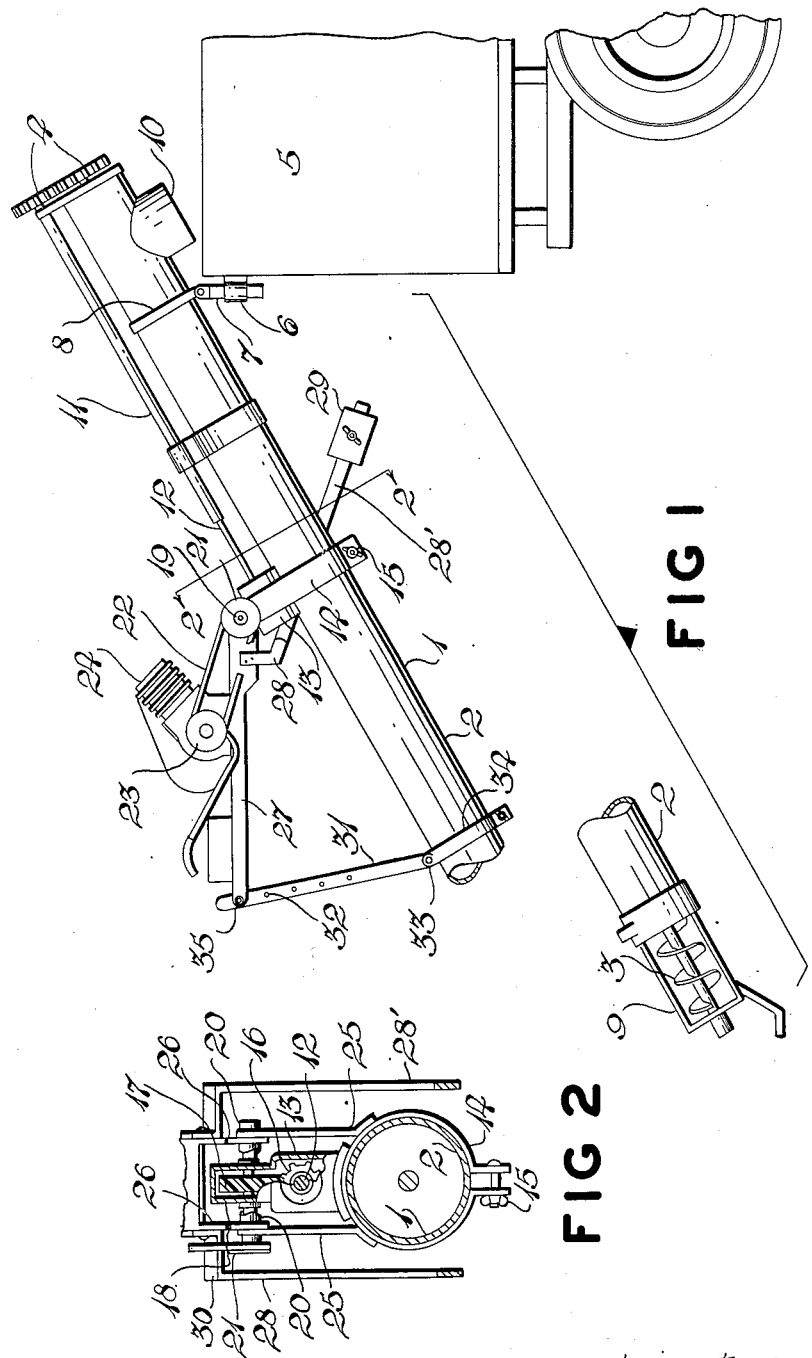

2,619,224

UNITED STATES PATENT OFFICE 2,619,224

CONVEYER DRIVE

Henry Bobrowski and Victor Bobrowski,
Morris, Manitoba, Canada

Application December 6, 1946, Serial No. 714,406

1 Claim. (Cl. 198—213)

The present invention consists of a self-contained conveyor for the transference of comminuted, or more particularly, granular materials such as grain, from a wagon into a granary for example, or from a granary into a wagon, a particular object being to provide (as indicated by the expression "self-contained") a device of the character herewithin described having a motor in combination therewith thus eliminating the use of a power take-off whereby the conveyor or conveying unit may be usefully employed by farmers for example who do not own a truck, but employ horses and wagons for transporting their grain.

A further object of the herein described invention is to provide conspicuously simplified means for pivotallly mounting a motor platform on a conveyor trunk using the axis of a transverse counter-shaft as the hinge pin on which the said platform pivots.

A further object is to provide a device of the character herewithin described which includes a counter-weight and counter-weight arm associated with the platform whereby the platform and motor thereon may be self-levelling regardless of the angulation of the conveyor tube or trunk.

With the foregoing objects in view, and such other objects and advantages as will become apparent to those skilled in the art to which this invention relates as this specification proceeds, the invention consists essentially in the arrangement and construction of parts all as hereinafter more particularly described, reference being had to the accompanying drawings, in which:

Figure 1 is a side view illustrating the present conveyor connected to a grain hauling wagon.

Figure 2 is a section on the line 2—2 of Figure 1.

In the drawings like characters of reference indicate corresponding parts in the different figures.

The present invention constitutes a continuation-in-part of our U. S. patent application Serial No. 652,656, filed March 7, 1946, and now abandoned, has particular application to the elevation and discharge of grain by farmers who do not own a truck to operate the spiral auger of their conveyor through a power take-off, and proceeding therefore to describe the present improvement in detail, reference is initially made to the conventional conveyor collectively designated 1 comprising a supporting structure 2 in the form of an elongated tubular trunk, and the conveying action 3 in the form of a spiral auger journalled at the upper and lower ends of the aforesaid trunk. At the upper end of the trunk are gear means collectively designated 4 for operating the auger 3, and it is to be understood that all the foregoing structure is conventional.

The conveyor is also commonly supported at any convenient point upon the side walls of a wagon 5 and by means of the bracket 6 and stanchion 7 rotatably held upon the trunk encircling collar 8 so that the open lower end 9 of the conveyor may be manipulated manually within a granary for the elevation of the grain therein through the aforesaid trunk and into the wagon via the outlet spout 10.

Journalled in spaced and external relationship to the trunk 2 and axially parallel therewith is a main drive-shaft 11 connected at the upper ends thereof to gear means 4, and, in the case of the present invention being telescopic at the lower end 12.

The telescopic lower end 12 extends into a boxing 13 mounted on the trunk encircling collar 14, which, it is to be understood is adjustable upon the length of the trunk 2 by slackening the wing nut and bolt assembly 15.

Keyed to portion 12 of drive-shaft 11 is a gear 16 designed to be driven by the gear 17 in mesh therewith and contained in the housing portion 18, gears 16 and 17 constituting a reduction assembly of which the latter is keyed for rotation to the transverse counter-shaft 19. Counter-shaft 19 rotates within the sleeves 20, and has keyed to one outer end thereof a driven pulley wheel 21 connected by belt to the driving pulley wheel 23 and the crankshaft of motor 24.

The sleeves 20 extend through apertures in the upper ends of a pair of supporting brackets 25 the lower ends of which are secured to collar 14. Also mounted upon the sleeves 20 for free rotation are the end-plates 26 of the supporting platform 27 upon which motor 24 is mounted.

Secured to the side of platform 27 near the points of rotation aforesaid is a pair of counter-weight arms 28 and 28' having adjustably positioned upon the length thereof the counter-weight 29. The aforesaid arms, it will be observed, project upon the opposite side of counter-shaft 19 to that upon which platform 26 projects, and consequently it will readily be understood that by the aforesaid agency, platform 27 may be preserved in the horizontal position regardless of the varying angle of inclination of the trunk 2.

From the accompanying Figure 2 it is to be seen that the arms 28 and 28' extend downwardly upon either side of trunk 2 being offset therefrom by the shoulder portion 30.

Alternatively to the counter-weight and counter-weight arm aforesaid, the bar 31 may be provided if desired, the same being provided with a plurality of spaced apertures 32 upon the length thereof and being secured pivotally at the point 33 to the collar 34 which, like collar 14, is adjustable upon the length of the trunk 2. A projecting wing or pair of wings 35 is in such case provided upon the left-hand end (with respect to Figure 1) of platform 27, the same having an aperture therein registerable with any one of the apertures 32 so that a nut and bolt may be passed through to secure the platform in any desired angular relationship with respect to that of trunk 2.

In view of the foregoing description and the accompanying drawings, it will be recognised that the present invention utilizes the transverse countershaft 19 in the dual capacity of a hinge-pin for the platform 27 as well as for operating the gear 17, and hence there will be no slackening of belt 22 in any angular position of platform 27 relative to trunk 2 as would be the case if the axis of rotation of the platform differed from the axis of counter-shaft 19.

Since many modifications can be made in the invention herein described and since the accompanying drawings have been prepared only to illustrate the relative arrangement and interaction of parts and not with regard to accuracy of dimensions for manufacturing purposes which in view of this disclosure we consider to entail merely mechanical skill together with the skill of the mechanical draftsman, and since many apparently widely different embodiments of this invention may be made within the spirit and scope of the accompanying claim without departing from such spirit and scope, it is intended that all matter contained in the accompanying specification shall be interpreted as illustrative only and not in a limiting sense and we desire only such limitations placed thereon as justice dictates.

What we claim as our invention is:

In the art of granular or comminuted material conveying, and in combination with an elongated, inclinable conveyor having supporting structure therefor; a platform, a motor on said platform, a counter-shaft mounted on said supporting structure normal to the longitudinal axis of said conveyor, a drive connection between said motor and said shaft, a drive connection between said shaft and said conveyor, said shaft also pivotally connecting said platform to said supporting structure at one end thereof, said supporting structure including a collar encircling said conveyor and being clamped thereto, said collar being capable of sliding adjustment along said conveyor, a pair of supporting brackets extending upwardly from said collar, said shaft being journalled for rotation within the upper ends of said brackets, and means to maintain said platform horizontally, said means including a pair of counter-weight arms secured to said platform adjacent the point of pivotal connection thereof, said arms extending downwardly and beyond said counter-shaft away from said platform, and adjustable counter-weights on said arms.

HENRY BOBROWSKI.
VICTOR BOBROWSKI.

REFERENCES CITED

The following references are of record in the file of this patent:

UNITED STATES PATENTS

| Number | Name | Date |
| --- | --- | --- |
| 274,540 | Williamson | Mar. 27, 1883 |
| 2,251,667 | Ehinger | Aug. 5, 1941 |
| 2,311,084 | Redler | Feb. 16, 1943 |
| 2,332,729 | Klosterman | Oct. 26, 1943 |
| 2,389,483 | Bobrowski et al. | Nov. 20, 1945 |
| 2,446,660 | Mulkey et al. | Aug. 10, 1948 |